(12) United States Patent
Kamimura

(10) Patent No.: US 10,876,664 B2
(45) Date of Patent: Dec. 29, 2020

(54) FEMALE PIPE COUPLING MEMBER HAVING COMMUNICATION TERMINAL

(71) Applicant: NITTO KOHKI CO., LTD., Tokyo (JP)

(72) Inventor: Yoshito Kamimura, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 0 days.

(21) Appl. No.: 16/573,921

(22) Filed: Sep. 17, 2019

(65) Prior Publication Data
US 2020/0072400 A1 Mar. 5, 2020

Related U.S. Application Data

(63) Continuation of application No. PCT/JP2018/012653, filed on Mar. 28, 2018.

(30) Foreign Application Priority Data

Apr. 7, 2017 (JP) .................... 2017-077050

(51) Int. Cl.
*F16L 37/22* (2006.01)
*F16L 25/00* (2006.01)
(Continued)

(52) U.S. Cl.
CPC .............. *F16L 37/22* (2013.01); *F16L 25/00* (2013.01); *F16L 25/01* (2013.01); *H01R 13/005* (2013.01);
(Continued)

(58) Field of Classification Search
CPC ......... F16L 37/22; F16L 25/00; F16L 37/252; F16L 2201/10; F16L 25/01; F16L 35/00;
(Continued)

(56) References Cited

U.S. PATENT DOCUMENTS

| 696,529 A | * | 4/1902 | Weitz | ................... H01R 13/005 |
| | | | | 439/192 |
| 5,658,159 A | * | 8/1997 | Gardner | .................. B61G 5/10 |
| | | | | 439/294 |

(Continued)

FOREIGN PATENT DOCUMENTS

| DE | 102010032189 A1 | * | 1/2012 | ........... F24H 1/0018 |
| DE | 102010053737 A1 | * | 6/2012 | ........... F01N 3/2066 |

(Continued)

OTHER PUBLICATIONS

International Search Report for International Application PCT/JP2018/012653, dated Jul. 3, 2018.

*Primary Examiner* — James M Hewitt, II
(74) *Attorney, Agent, or Firm* — Burris Law, PLLC

(57) ABSTRACT

The pipe coupling member has a female pipe coupling body, and a cylindrical front and rear cover members fitted to the female pipe coupling body. The front cover member includes a communication assembly including a communication terminal, a communication cable extending rearward from the communication terminal inside the front cover member and further extending rearward from the rear end of the female pipe coupling body, and a connector terminal at the rear end of the communication cable. The rear cover member is configured to allow the connector terminal to be passed forward inside the rear cover member along a hose attached to the rear end of the female pipe coupling body when the rear cover member is displaced rearward in a state where the hose and the communication cable are allowed to pass inside the rear cover member.

7 Claims, 6 Drawing Sheets

(51) Int. Cl.
*F16L 25/01* (2006.01)
*H01R 13/00* (2006.01)
*H01R 13/506* (2006.01)
*B60L 3/00* (2019.01)
*F16L 37/252* (2006.01)
*F17C 13/02* (2006.01)

(52) U.S. Cl.
CPC .......... *H01R 13/506* (2013.01); *B60L 3/0053* (2013.01); *F16L 37/252* (2013.01); *F16L 2201/10* (2013.01); *F17C 13/02* (2013.01); *F17C 2205/037* (2013.01); *F17C 2205/0352* (2013.01); *F17C 2221/012* (2013.01)

(58) Field of Classification Search
CPC ........ F16L 57/00; B60L 3/0053; F17C 13/02; F17C 2205/0352; F17C 2205/037; F17C 2221/012; Y02E 60/32; H01R 13/506; H01R 13/627; H01R 13/66; H01R 13/42; H01R 13/502; H01R 13/5045; H01R 13/514; H01R 13/62; H01R 13/005; H01R 2201/26
USPC .......................................................... 285/45
See application file for complete search history.

(56) References Cited

U.S. PATENT DOCUMENTS

| | | | |
|---|---|---|---|
| 8,529,273 B2* | 9/2013 | Maegawa | H01R 13/5227 439/34 |
| 2004/0169368 A1 | 9/2004 | Garber et al. | |
| 2010/0247108 A1 | 9/2010 | Ishikawa et al. | |
| 2011/0006512 A1* | 1/2011 | James | F16L 57/00 285/45 |
| 2014/0106587 A1* | 4/2014 | Verhagen | H01B 7/423 439/196 |
| 2015/0377398 A1 | 12/2015 | Kamimura et al. | |
| 2018/0083381 A1* | 3/2018 | Mueller | H01R 13/5205 |

FOREIGN PATENT DOCUMENTS

| | | |
|---|---|---|
| JP | S64-053593 | 4/1989 |
| JP | 2004537685 | 12/2004 |
| JP | 2010198944 | 9/2010 |
| JP | 2010236657 | 10/2010 |
| JP | 2013167291 | 8/2013 |
| JP | 2016027280 | 2/2016 |
| JP | 2017033862 | 2/2017 |
| WO | 2015150341 | 10/2015 |

* cited by examiner

FEMALE PIPE COUPLING MEMBER HAVING COMMUNICATION TERMINAL

CROSS-REFERENCE TO RELATED APPLICATIONS

This application is a continuation of International Application No. PCT/JP2018/012653, filed on Mar. 28, 2018, which claims priority to and the benefit of Japanese Patent Application No. 2017-077050, filed on Apr. 7, 2017. The disclosures of the above applications are incorporated herein by reference.

FIELD

The present disclosure relates to a pipe coupling member having a communication terminal for use, for example, in performing appropriate fuel supply to a vehicle tank by communicating information between the fuel supply side and the vehicle side unidirectionally or bidirectionally. More particularly, the present invention relates to a female pipe coupling member having a communication terminal for the above-described use.

BACKGROUND

Recently, vehicles having a fuel cell using hydrogen gas as a power source have been put to practical use, and such vehicles need to be supplied with hydrogen gas at a hydrogen station as in the case of gasoline vehicles. The supply of hydrogen gas is generally performed by coupling a female pipe coupling member attached to the distal end of a hose extending from a hydrogen station-side hydrogen gas storage tank (station-side tank) to a male pipe coupling member attached to the inlet of a vehicle tank.

Hydrogen gas supplied from the station-side tank to the vehicle tank has, usually, been pressurized to about 70 MPa. Therefore, it is demanded that all possible measures be taken to avoid the occurrence of an accident during the supply of hydrogen gas. As one of such measures, a technique has been developed in which the mutually opposing surfaces (front faces) of male and female pipe coupling members to be coupled together are provided with communication terminals, respectively, which perform transmission and reception of information by infrared rays or the like, thereby making it possible to stop the hydrogen supply at the required amount of supply by receiving, at the female pipe coupling member side, information about the amount of hydrogen in the vehicle tank, and also possible to stop the hydrogen supply by receiving, at the station side, information about some problem at the vehicle tank side (Patent Literature 1, and Non-Patent Literature 1).

At the hydrogen station, the user picks up and connects the female pipe coupling member attached to the distal end of the hydrogen supply hose to the male pipe coupling member of the vehicle tank to supply hydrogen gas. At this time, the user may undesirably drop the picked-up female pipe coupling member on the ground or may hit the female pipe coupling member against the vehicle or other surroundings, which may result in damage to the communication terminal located at the front face of the female pipe coupling member. On such an occasion, it may be necessary to replace the communication terminal.

It should be noted that the foregoing description has been made of a pipe coupling member handling hydrogen gas pressurized to a very high pressure. In this regard, there are also known pipe couplings in which the mutually opposing front faces are provided with communication terminals, respectively, which have a function similar to the above (Patent Literature 2), in addition to those which handle such a high-pressure fluid.

Patent Literature 1: Japanese Patent Application Publication No. 2016-27280
Patent Literature 2: Japanese Utility Model Registration Application Publication No. Hei 1-53593
Non-Patent Literature 1: Advertisement of WEH® Fueling Nozzle TK17 H2 70 MPa ENR with NEC interface, for fast filling of cars, self-service

SUMMARY

Technical Problem

In the female pipe coupling member shown in Patent Literature 1, the communication terminal has a communication cable connected thereto. The communication cable extends from the rear end of the communication terminal through inside the female pipe coupling member and further extends rearward from the rear end of the female pipe coupling member to a connector terminal (connected to a station-side control circuit performing required control on the basis of signals transmitted and received between the communication terminals). Accordingly, when the communication terminal is to be replaced, it is necessary to replace the communication cable and the connector terminal, together with the communication terminal as one unit. It is therefore necessary to wholly disassemble the female pipe coupling member when replacing the communication terminal, and disassembling and reassembling operations are troublesome. On the other hand, the female pipe coupling member shown in Non-Patent Literature 1 has a cylindrical communication terminal member having a communication terminal at a forward end thereof and having at a rear end thereof a connector terminal connected to the communication terminal. The communication terminal member is concentrically screwed to a forward portion of a pipe coupling body part having a function as a female pipe coupling member. Thus, the connector terminal is connected to a connector terminal provided in the pipe coupling body, and a cylindrical protection cover is further attached around the communication terminal member and the female pipe coupling member, which are connected together as described above. Accordingly, the communication terminal member also requires troublesome operations for replacement (disassembling and reassembling operations). In the pipe coupling disclosed in the above-mentioned Patent Literature 2 also, the communication terminals are incorporated in the pipe coupling members, respectively, and troublesome operations are required for replacement of the communication terminals.

The present invention has been made in view of the above-described circumstances, and an object of the present invention is to provide a female pipe coupling member having a communication terminal attached to a forward end thereof, which is configured to facilitate the communication terminal replacing operation required when the communication terminal has been broken, for example.

Solution to Problem

A female pipe coupling member having a communication terminal according to the present invention has the following: a female pipe coupling body couplable to a male pipe coupling member received therein from the forward end thereof to provide fluid communication between the male pipe coupling member and a hose attached to the rear end of the female pipe coupling body; a cylindrical front cover member fitted around the female pipe coupling body so as to be removable from the forward end side of the female pipe coupling body, the front cover member including a communication assembly comprising a communication terminal provided at the forward end thereof, a communication cable extending rearward from the communication terminal outside the female pipe coupling body and further extending rearward from the rear end of the female pipe coupling body, and a connector terminal connected to the rear end of the communication cable; and a cylindrical rear cover member fitted around the female pipe coupling body so as to be removable from the rear end side of the female pipe coupling body, the rear cover member being configured to allow the connector terminal to be passed forward inside the rear cover member along the hose, which is attached to the rear end of the female pipe coupling body, when the rear cover member is displaced rearward from the female pipe coupling body in a state where the hose and the communication cable are allowed to pass inside the rear cover member in the longitudinal direction.

With the female pipe coupling member, when the communication assembly comprising the communication terminal, the communication cable, and the connector terminal is to be replaced with a new one, the rear cover member is removed from the female pipe coupling body and moved rearward along the hose to a position rearward of the female pipe coupling body. The connector terminal is disconnected beforehand from the associated connector terminal, to which the connector terminal has been connected, and the front cover member is removed from the female pipe coupling body and moved forward. Consequently, the connector terminal connected to the rear end of the communication cable is moved forward along the hose and passes through inside the rear cover member. Thus, the communication assembly is removed from the female pipe coupling body, together with the front cover member. Next, a new front cover member equipped with a new communication assembly is prepared, and a connector terminal attached to the distal end of the communication assembly is passed rearward through inside the rear cover member, which has been removed from the female pipe coupling body. In this state, the rear cover member and the front cover member are connected to the female pipe coupling body. Thus, the female pipe coupling member having a communication terminal according to the present invention enables the communication assembly including the communication terminal to be replaced without disassembling the female pipe coupling body.

Specifically, the communication cable may extend rearward from the communication terminal through inside the front cover member and further extend rearward from the rear end of the front cover member. The communication cable may be configured to enter the interior of the front cover member before reaching the rear end of the front cover member. However, the above-described replacing operation is facilitated by configuring the communication cable to extend through inside the front cover member to the rear end of the latter.

The front cover member fitted to the female pipe coupling body may be prevented from being displaced rearward by engaging the female pipe coupling body.

The arrangement may be as follows. The female pipe coupling member further includes a stop ring removably fitted in an annular groove formed in the outer peripheral surface of a forward end portion of the female pipe coupling body to engage the front cover member. The front cover member can be removed forward from the female pipe coupling body by removing the stop ring from the annular groove. This configuration facilitates the removal of the front cover member.

The rear cover member may be secured to the female pipe coupling body in the longitudinal direction by a securing screw at a position where the rear cover member is fitted to the female pipe coupling body.

The arrangement may be as follows. The front cover member has a front circular cylindrical portion surrounding the periphery of the female pipe coupling body, and an elongated front protruding portion protruding radially outward from the front circular cylindrical portion and extending in the longitudinal direction. The front protruding portion has a cable hole allowing the communication cable to pass therethrough in the longitudinal direction. The rear cover member has a rear circular cylindrical portion and a rear protruding portion, which correspond to the front circular cylindrical portion and the front protruding portion, respectively, of the front cover member. The rear protruding portion has a cable groove opening radially inward and extending in the longitudinal direction. The cable groove allows passage therethrough of the communication cable extending from the rear end of the front protruding portion. The above-described configuration allows the communication cable to pass through inside the front and rear cover members while permitting the front and rear circular cylindrical portions to have a size as small as possible but sufficient to surround the female pipe coupling body.

The arrangement may be as follows. The female pipe coupling body has the following: a locking member fixedly coupling the male pipe coupling member received from the forward end to the female pipe coupling body; and a lock operating member for displacing the locking member between a locking position and an unlocking position, the lock operating member extending from between the front cover member and the rear cover member to the outside of the front cover member and the rear cover member. The front protruding portion has a rear end portion extending rearward beyond the rear end of the front circular cylindrical portion to engage the forward end of the rear protruding portion. When the front protruding portion and the rear protruding portion are engaged with each other, a circumferentially extending opening is formed between the front circular cylindrical portion and the rear circular cylindrical portion. The lock operating member has a cylindrical portion extending rearward from a forward end portion thereof that engages the locking member, through inside the front circular cylindrical portion, and an operating portion extending from the cylindrical portion to the outside of the rear circular cylindrical portion through the opening. The lock operating member is displaced between the locking position and the unlocking position by displacing the operating portion in the longitudinal direction.

In the conventional pipe coupling, an operating portion as described above is configured to extend to the outside through an opening provided in a cover member. In the present invention, however, the lock operating part extends to the outside from between the front and rear cover members, as described above, thereby allowing the front and rear cover members to be pulled away from the female pipe coupling body forwardly and rearwardly, respectively, without being interfered by the lock operating part.

Embodiments of a female pipe coupling member having a communication terminal according to the present invention will be explained below on the basis of the accompanying drawings.

DRAWINGS

DETAILED DESCRIPTION

Figure 1:
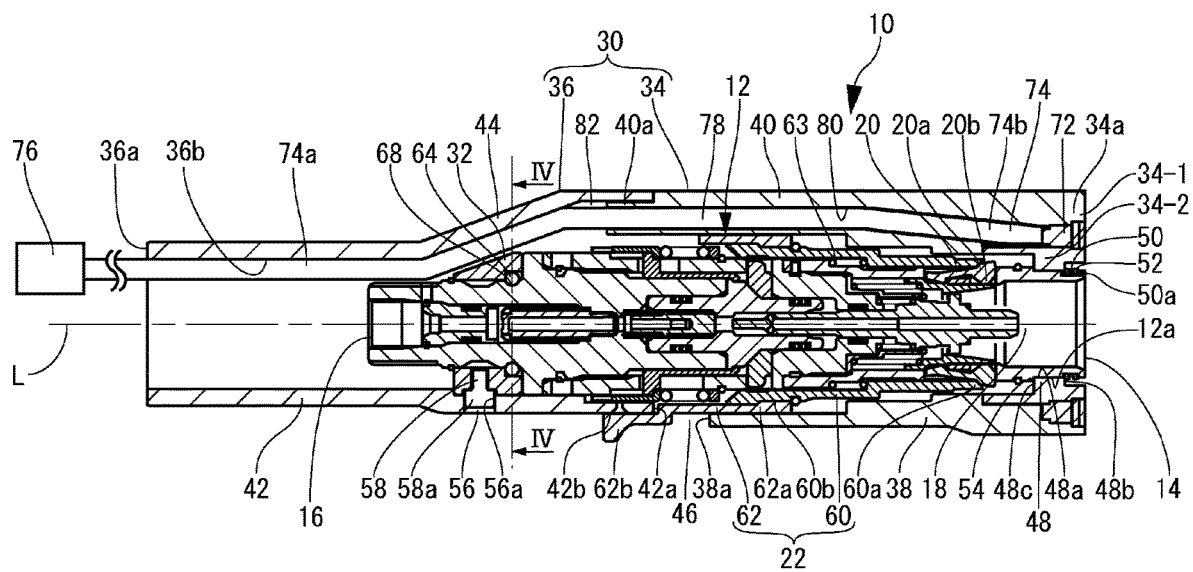
FIG. 1 is a sectional side view of a female pipe coupling member according to an embodiment of the present invention.

A female pipe coupling member 10 shown in FIG. 1 comprises a female pipe coupling body 12 and a cylindrical cover 30 rotatably attached around the female pipe coupling body 12. The female pipe coupling member 10 is a hydrogen injection nozzle attached to a hydrogen supply hose (not shown) at a hydrogen station. The female pipe coupling member 10 is detachably coupled to a male pipe coupling member (not shown), which is a receptacle connected to a hydrogen tank of a fuel cell vehicle, to provide fluid communication between the hose at the hydrogen station and the male pipe coupling member, thereby filling high-pressure hydrogen into the hydrogen tank of the fuel cell vehicle from the hydrogen station. The female pipe coupling member 10 has, as will be described later, a communication terminal at the forward end of the cylindrical cover 30, and is configured such that when the female pipe coupling member 10 is coupled to the associated male pipe coupling member, the communication terminal is positioned to face the associated communication terminal of the associated male pipe coupling member, thereby enabling transmission and reception of information between the communication terminals.

The female pipe coupling body 12 has substantially the same structure as that disclosed in the above-mentioned Patent Literature 1; therefore, a detailed explanation thereof is omitted. The female pipe coupling body 12 has a forward end 14 through which the associated male pipe coupling member is received and coupled to the female pipe coupling member 10, a rear end 16 to which a hose is attached, and a fluid passage 18 extending in the direction of a longitudinal axis L from the forward end 14 to the rear end 16. The female pipe coupling body 12 further includes a locking member 20 for fixedly coupling the male pipe coupling member received into the fluid passage 18, and a lock operating member 22 for actuating the locking member 20. The locking member 20 is displaceable between a locking position and an unlocking position. In the locking position, a latching projection 20b of the locking member 20 that projects radially inward at a forward end 20a of the locking member 20 engages an engaging groove formed in the outer peripheral surface of the male pipe coupling member to fixedly couple the male pipe coupling member to the female pipe coupling member 10. In the unlocking position, the latching projection 20b is displaced from the locking position radially outward to the illustrated position to release the male pipe coupling member from the fixedly coupled state. The lock operating member 22 is displaceable in the direction of the longitudinal axis L (left-right direction as seen in the figure) between a coupling position where the lock operating member 22 holds the locking member 20 in the locking position, and an attaching-detaching position where the lock operating member 22 is displaced from the coupling position rearward in the direction of the longitudinal axis L (leftward as seen in the figure) to reach the illustrated position, thereby allowing the locking member 20 to assume the unlocking position. The female pipe coupling body 12 constitutes a chuck structure releasably coupling the male pipe coupling member by the locking member 20 and the lock operating member 22, which are configured as described above.

Figure 2:
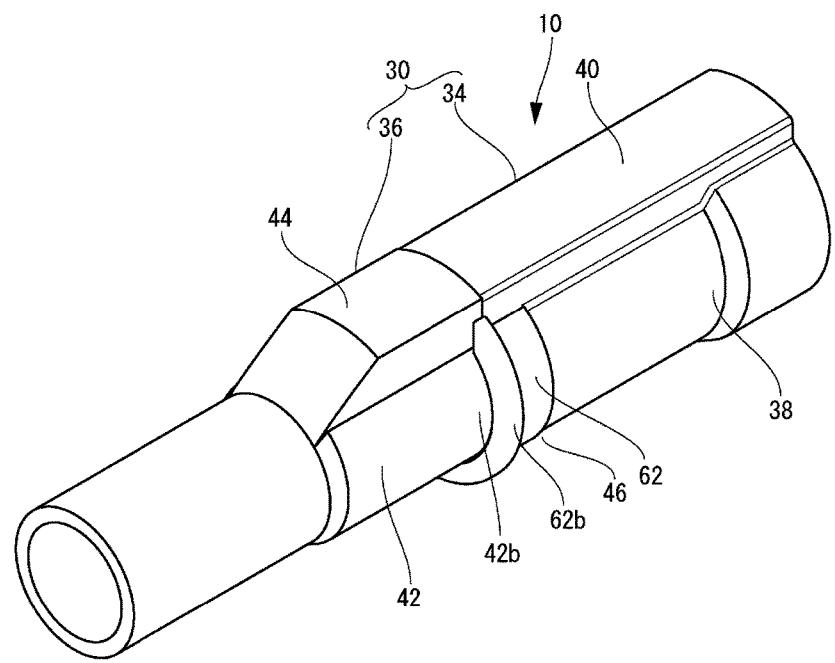
FIG. 2 is an external perspective view of the female pipe coupling member shown in FIG. 1, in which illustration of a communication cable and a connector terminal is omitted.

The cylindrical cover 30 is rotatably attached around the female pipe coupling body 12 through an annular sliding member 32 circumferentially slidably attached around an outer peripheral surface 12a of the female pipe coupling body 12. The cylindrical cover 30 comprises a front cover member 34 and a rear cover member 36, which are cylindrical members, respectively. As shown in FIG. 2, the front cover member 34 has a front circular cylindrical portion 38 surrounding the periphery of the female pipe coupling body 12, and an elongated front protruding portion 40 protruding radially outward from the front circular cylindrical portion 38 and extending in the longitudinal direction. Similarly, the rear cover member 36 has a rear circular cylindrical portion 42 surrounding the periphery of the female pipe coupling body 12, and an elongated rear protruding portion 44 protruding radially outward from the rear circular cylindrical portion 42 and extending in the longitudinal direction. The front protruding portion 40 extends rearward beyond a rear end 38a of the front circular cylindrical portion 38. In a state where the front cover member 34 and the rear cover member 36 are each attached to the female pipe coupling body 12, a rear end portion 40a of the front protruding portion 40 is inserted in and engaged with the inside of the rear protruding portion 44. Thus, the front cover member 34 and the rear cover member 36 are engaged with each other in the rotational direction so as to rotate as an integral unit. Further, a circumferentially extending opening 46 is formed between the rear end 38a of the front circular cylindrical portion 38 and the forward end 42a of the rear circular cylindrical portion 42. The female pipe coupling member 10 is configured such that the user grips mainly the rear cover member 36 of the cylindrical cover 30 when performing operation.

Figure 3:
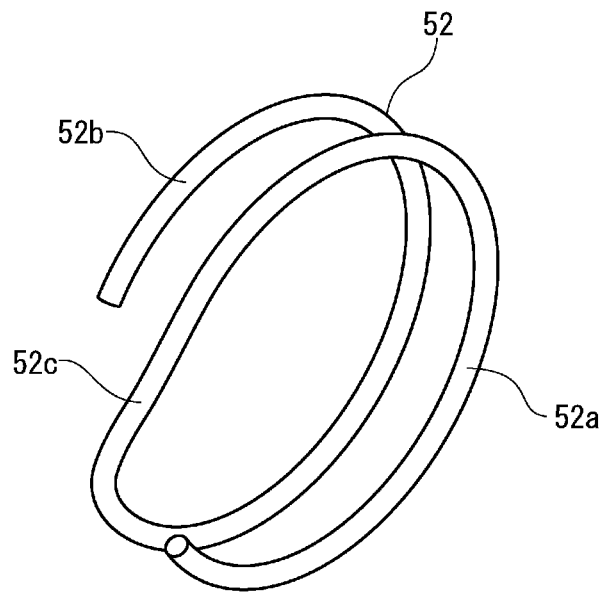
FIG. 3 is a perspective view of a stop ring.

As shown in FIG. 1, the front cover member 34 comprises a front cover outer member 34-1 constituting the greater part of the front cover member 34 and holding a communication terminal 72 (described later) from the outer side, and a front cover inner member 34-2 secured to the inner side of the front cover outer member 34-1 to hold the communication terminal 72 from the inner side. The front cover inner member 34-2 is provided with a fitting portion 48 projecting radially inward. The front cover member 34 is attached to the periphery of the female pipe coupling body 12 from the forward end 14 side such that an inner peripheral surface 48a of the fitting portion 48 is fitted to the outer peripheral surface 12a of the forward end portion of the female pipe coupling body 12. The female pipe coupling body 12 has an annular groove 50 formed in the outer peripheral surface 12a thereof, and a stop ring 52 is fitted in the annular groove 50 to hold the front cover member 34 to the female pipe coupling body 12 from the front side. The stop ring 52 comprises, as shown in FIG. 3, a front arcuate portion 52a and a rear arcuate portion 52b, which are bent in a circular-arc shape parallel to each other, and a connecting portion 52c connecting together the front and rear arcuate portions 52a and 52b. When fitted in the annular groove 50 of the female pipe coupling body 12, the stop ring 52 is compressed in the direction of the longitudinal axis L between a forward side surface 50a of the annular groove 50 and a forward side surface 48b of the fitting portion 48 of the front cover member 34. Thus, the stop ring 52 presses the fitting portion 48 rearward. The front cover member 34 pressed rearward by the stop ring 52 is stopped from being displaced further rearward by abutment of a rear side surface 48c of the fitting portion 48 against a step portion 54 of the outer peripheral surface 12a of the female pipe coupling body 12. In other words, the front cover member 34 is secured in the direction of the longitudinal axis L relative to the female pipe coupling body 12 by having the fitting portion 48 thereof held between the step portion 54 and the stop ring 52.

The rear cover member 36 is attached around the female pipe coupling body 12 by being fitted from the rear end 16 side. Specifically, the rear cover member 36 is fitted to an annular sliding member 32, and a securing screw 58 is threadedly engaged with the annular sliding member 32 through a locking through-hole 56 formed in the rear cover member 36 so as to extend therethrough radially such that a head 58a of the securing screw 58 is engaged with an inner peripheral surface 56a of the locking through-hole 56, thereby allowing the rear cover member 36 to be fixed relative to the annular sliding member 32 in both the longitudinal and circumferential directions. It should be noted that the rear cover member 36, which is secured to the female pipe coupling body 12 through the annular sliding member 32, is rotatable in the circumferential direction relative to the female pipe coupling body 12 although fixed in the longitudinal direction. When a member is to be secured by a screw, the screw is usually tightened with a locking member sandwiched between the member with which the screw is to be threadedly engaged and the head of the screw. In the female pipe coupling member 10, however, the rear cover member 36 is secured to the annular sliding member 32 by engaging the head 58a of the securing screw 58 with the inner peripheral surface 56a of the locking through-hole 56, as has been described above. By this securing method, the rear cover member 36 is not tightened with a strong force; therefore, when the rear cover member 36 is formed from a material of relatively low rigidity and wear resistance, e.g. a resin, it is possible to prevent the rear cover member 36 from being broken by tightening force of the securing screw 58 and to prevent the securing screw 58 from becoming loose due to wear or deformation of the rear cover member 36. Further, the securing screw 58 can be prevented from projecting outside even if the rear cover member 36 is reduced in wall thickness.

The lock operating member 22 comprises an engaging member 60 having a forward end portion 60a engaging the locking member 20, and an operating member 62 attached to the engaging member 60 so as to be rotatable about the longitudinal axis L and extending to the outside of the cylindrical cover 30. The engaging member 60 is a cylindrical member extending rearward from the forward end portion 60a in the direction of the longitudinal axis L inside the front circular cylindrical portion 38 of the front cover member 34. The engaging member 60 is urged forward by a spring 63. The operating member 62 has a cylindrical mounting portion 62a mounted so as to be circumferentially slidable along an outer peripheral surface 60b of the engaging member 60, and an operating portion 62b extending from the cylindrical mounting portion 62a to the outside through the opening 46 between the front cover member 34 and the rear cover member 36 and being located around the rear cover member 36. The operating portion 62b has, as shown in FIG. 2, a C-shaped configuration extending circumferentially along an outer peripheral surface 42b of the rear circular cylindrical portion 42 and having a cut portion formed at a position corresponding to the rear protruding portion 44. The engaging member 60 and the operating member 62 are fixed in the direction of the longitudinal axis L; therefore, the engaging member 60 is displaced in the direction of the longitudinal axis L, together with the operating member 62, by actuating the operating portion 62b of the operating member 62 in the direction of the longitudinal axis L. Accordingly, by actuating the operating portion 62b located outside the cylindrical cover 30 in the direction of the longitudinal axis L, the locking member 20 located inside the cylindrical cover 30 can be actuated between the locking position and the unlocking position. On the other hand, the operating member 62 is rotatable relative to the engaging member 60, so that when the cylindrical cover 30 rotates about the longitudinal axis L relative to the female pipe coupling body 12, the operating member 62 is circumferentially engaged by the rear protruding portion 44 and rotated together with the cylindrical cover 30. The engaging member 60 is urged by the spring 63 and receives relatively large frictional resistance at areas of contact with the spring 63 and the locking member 20. Therefore, a relatively large force is required to rotate the engaging member 60. Further, if the engaging member 60 is forcedly rotated in a state where there is such a large frictional resistance, wear will also occur between the members. However, the operating member 62 is rotatable relative to the engaging member 60, as has been described above; therefore, it is possible to achieve smooth rotation and to prevent wear between the members. It should be noted that the engaging member 60 and the operating member 62, which constitute the lock operating member 22, may be formed as an integral member in order to simplify the structure although the above-described advantages cannot be achieved. That is, the lock operating member 22 may be formed into a single member having a cylindrical portion extending rearward from the forward end portion 60a engaging the locking member 20 through inside the front circular cylindrical portion 38 of the front cover member 34, and an operating portion 62b extending from the cylindrical portion to the outside of the rear circular cylindrical portion 42 through the opening 46 between the front cover member 34 and the rear cover member 36.

Figure 4:
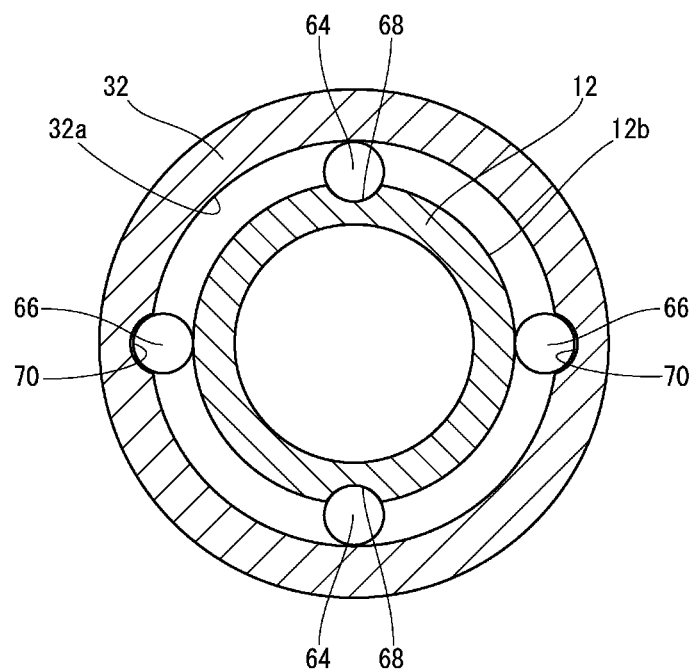
FIG. 4 is a sectional view taken along the line IV-IV in FIG. 1, in which illustration of members in a fluid passage is omitted.

The female pipe coupling member 10 includes a swivel mechanism for rotatably attaching the cylindrical cover 30 to the female pipe coupling body 12. The swivel mechanism comprises, as shown in FIG. 4, a female pipe coupling body (inner member) 12 having an outer peripheral surface 12b of circular cross-section, an annular sliding member (outer member) 32 disposed around the female pipe coupling body 12 and having an inner peripheral surface 32a of circular cross-section, and first rolling members 64 and second rolling members 66, which are disposed between the outer peripheral surface 12b of the female pipe coupling body 12 and the inner peripheral surface 32a of the annular sliding member 32. The female pipe coupling body 12 has two first retaining recesses 68 formed in the outer peripheral surface 12b at respective positions diametrically opposing each other. Similarly, the annular sliding member 32 has two second retaining recesses 70 formed in the inner peripheral surface 32a at respective positions diametrically opposing each other. The first rolling members 64 are partially received and rotatably retained in the respective first retaining recesses 68. Similarly, the second rolling members 66 are partially received and rotatably retained in the respective second retaining recesses 70. The first rolling members 64 and the second rolling members 66 are all spherical members and are disposed at respective positions aligned with each other in the direction of the longitudinal axis L. It should be noted that the first rolling members 64 and the second rolling members 66 may have other shapes having a circular cross-section, e.g. a circular columnar shape or a barrel shape.

Figure 5:
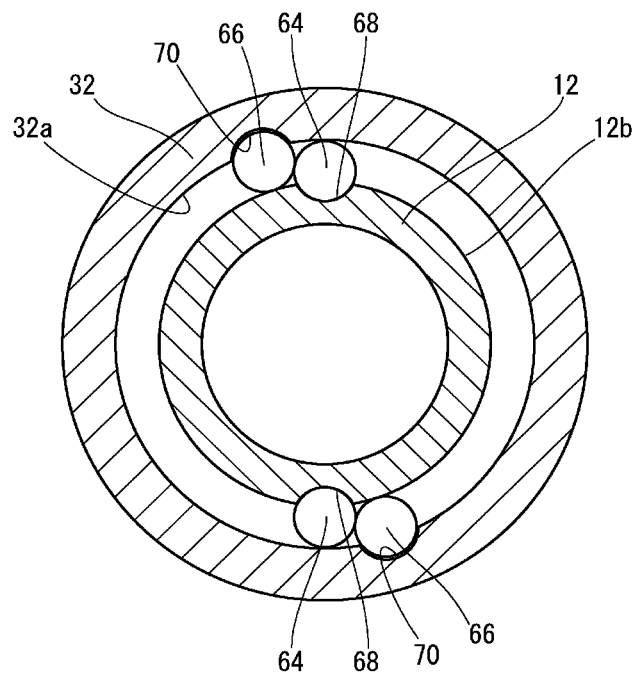
FIG. 5 is a sectional view taken along the line IV-IV in FIG. 1, showing a state where a cylindrical cover has rotated clockwise relative to a female pipe coupling body.
Figure 6:
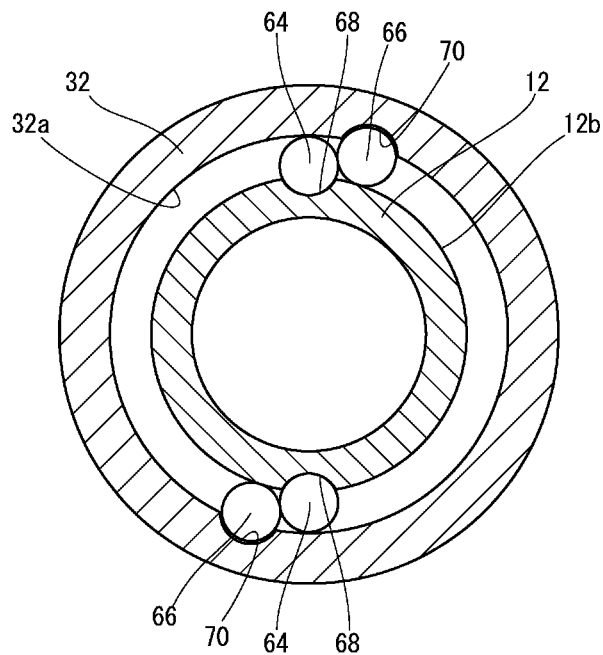
FIG. 6 is a sectional view taken along the line IV-IV in FIG. 1, showing a state where the cylindrical cover has rotated counterclockwise relative to the female pipe coupling body.

When the cylindrical cover 30 rotates relative to the female pipe coupling body 12, the first rolling members 64 are retained in the first retaining recesses 68, and the positions thereof are maintained. On the other hand, the second rolling members 66 are displaced in the circumferential direction about the longitudinal axis L, together with the cylindrical cover 30. At this time, the first rolling members 64 and the second rolling members 66 rotate in the first retaining recesses 68 and the second retaining recesses 70, respectively, according to frictional forces that the first and second rolling members 44 and 66 receive from the outer peripheral surface 12b of the female pipe coupling body 12 and the inner peripheral surface 32a of the annular sliding member 32, thereby smoothing the rotation of the annular sliding member 32 relative to the female pipe coupling body 12. When the cylindrical cover 30 is rotated clockwise as seen in FIG. 4 relative to the female pipe coupling body 12, as shown in FIG. 5, the second rolling members 66 abut against the first rolling members 64, respectively, in the clockwise direction. Consequently, the cylindrical cover 30 is restricted from rotating clockwise beyond the position shown in FIG. 5. Similarly, when the cylindrical cover 30 is rotated counterclockwise as seen in FIG. 4 relative to the female pipe coupling body 12, as shown in FIG. 6, the second rolling members 66 abut against the first rolling members 64, respectively, in the counterclockwise direction. Consequently, the cylindrical cover 30 is restricted from rotating counterclockwise beyond the position shown in FIG. 6. That is, in the relevant swivel mechanism, the first rolling members 64 and the second rolling members 66 abut against each other in the direction of rotation, thereby limiting the range of rotation of the annular sliding member 32, which is the outer member, and the cylindrical cover 30 secured to the annular sliding member 32. The swivel mechanism, as described above, is configured to limit the range of rotation of the annular sliding member 32 and the cylindrical cover 30 secured thereto by circumferential abutment of the first and second rolling members 64 and 66 for smoothing the relative rotation between the female pipe coupling body 12, which is the inner member, and the annular sliding member 32, which is the outer member, and it is therefore unnecessary to separately provide a structure solely for the purpose of limiting the rotation range. Accordingly, it is possible to achieve a simplified structure as compared to the conventional configuration. It should be noted that although in this embodiment two first rolling members 64, two second rolling members 66, two first retaining recesses 68, and two second retaining recesses 70 are disposed to limit the range of rotation of the cylindrical cover 30 to a little less than 180o, the configuration of these members and recesses may be appropriately changed according to the desired rotation range. For example, three rolling members and three retaining recesses may be disposed at equal intervals as each of first and second rolling members 64 and 66 and each of first and second retaining recesses 68 and 70 to limit the rotation range to a little less than 120o, or only one rolling member and only one retaining recess may be disposed as each of first and second rolling members 64 and 66 and each of first and second retaining recesses 68 and 70 to limit the rotation range to a little less than 360o.

The front cover member 34 has a communication assembly 78 comprising a communication terminal 72 provided at a forward end portion 34a thereof, a communication cable 74 extending rearward from the communication terminal 72, and a connector terminal 76 connected to the rear end of the communication cable 74. To the connector terminal 76 is connected an associated connector terminal (not shown) attached to a communication cable connected to a control unit of a dispenser at a hydrogen station. The communication cable 74 extends rearward from the communication terminal 72 outside the female pipe coupling body 12 through a cable hole 80 provided in the front protruding portion 40 of the front cover member 34. The communication cable 74 further extends rearward inside the rear cover member 36 through a cable groove 82 provided in the rear protruding portion 44 so as to open radially inward, to reach beyond a rear end 36a of the rear cover member 36. When the female pipe coupling member 10 is coupled to the associated male pipe coupling member, the communication terminal 72 is positioned to face an associated communication terminal similarly disposed in the male pipe coupling member, thus performing transmission and reception of signals by infrared rays between the communication terminal 72 and the associated communication terminal. It should be noted that the communication devices are not limited to those using infrared rays but may be wireless communication devices using electromagnetic waves in other frequency bands.

A rearward portion 74a of the communication cable 74 is held on the outer peripheral surface of a hose connected to the rear end 16 of the female pipe coupling body 12 by a spiral tube wound around the hose. Accordingly, when the cylindrical cover 30 rotates relative to the female pipe coupling body 12, the communication cable 74 is twisted between a forward portion 74b held in the cable hole 80 of the front cover member 34 and the rearward portion 74a held on the outer peripheral surface of the hose. If the range of rotation of the cylindrical cover 30 is not limited, the cylindrical cover 30 may rotate to a considerable extent, causing a heavy load to be applied to the communication cable 74, which may result in the communication cable 74 being disconnected or coming off the communication terminal 72 or the connector terminal 76. In the female pipe coupling member 10, however, the above-described swivel mechanism limits the range of rotation of the cylindrical cover 30. Therefore, there is no possibility of the cylindrical cover 30 rotating to such an extent that a heavy load is applied to the communication cable 74, and thus it is possible to prevent disconnection or the like of the communication cable 74 due to the rotation of the cylindrical cover 30.

The cylindrical cover 30 is removably attached to the female pipe coupling body 12, as has been described above, and the front cover member 34, in particular, is configured to be easily removable from the female pipe coupling body 12, together with the communication assembly 78, as will be described below.

Figure 7:
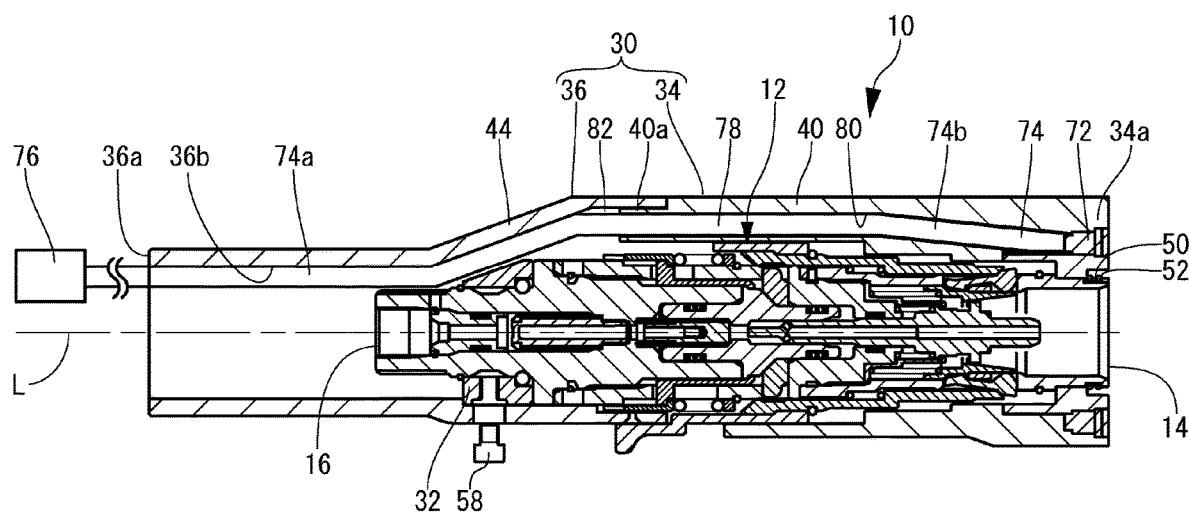
FIG. 7 is a first drawing showing a cylindrical cover attaching-detaching operation.
Figure 8:
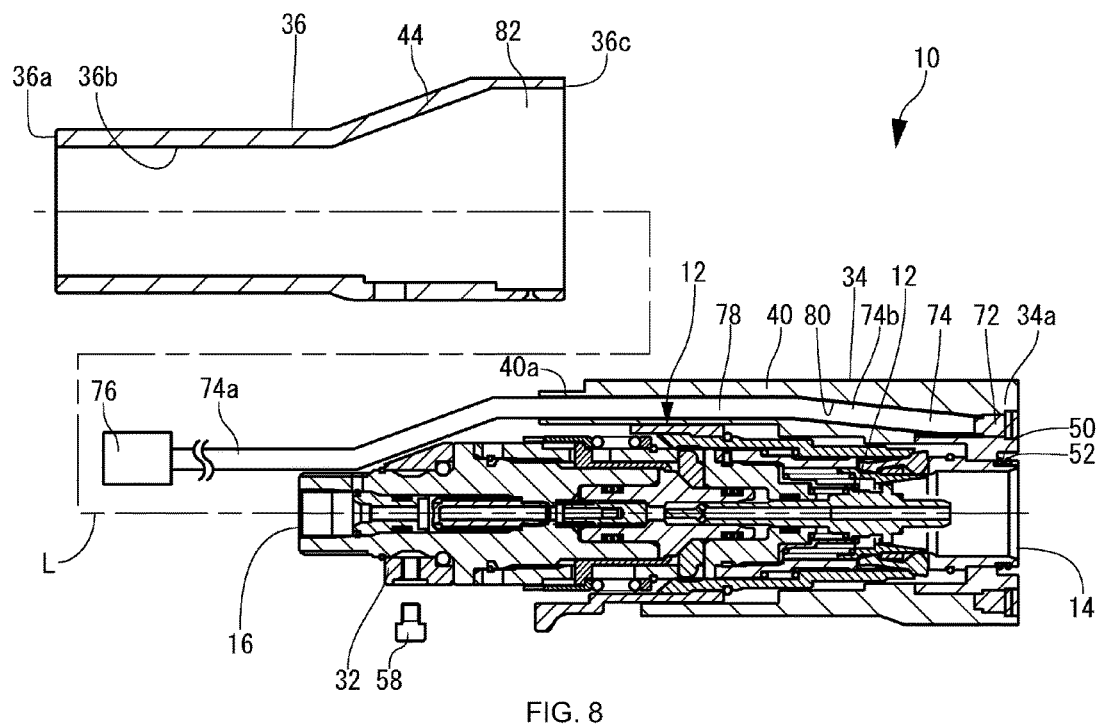
FIG. 8 is a second drawing showing the cylindrical cover attaching-detaching operation.
Figure 9:
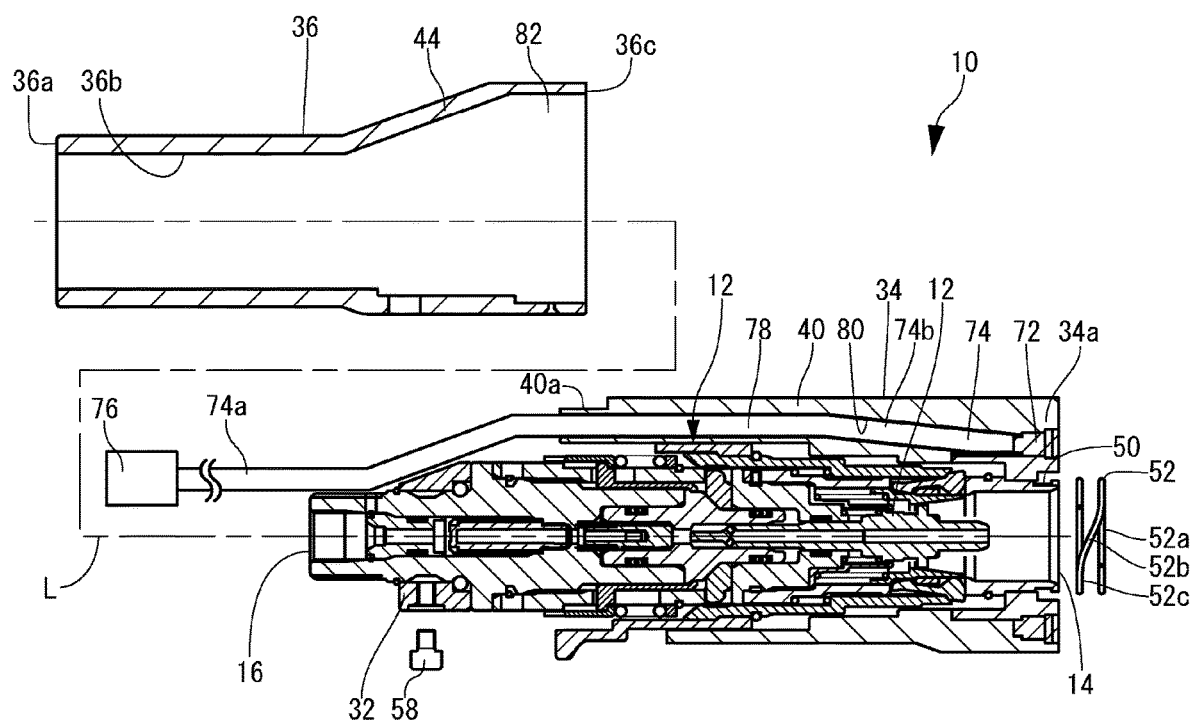
FIG. 9 is a third drawing showing the cylindrical cover attaching-detaching operation.
Figure 10:
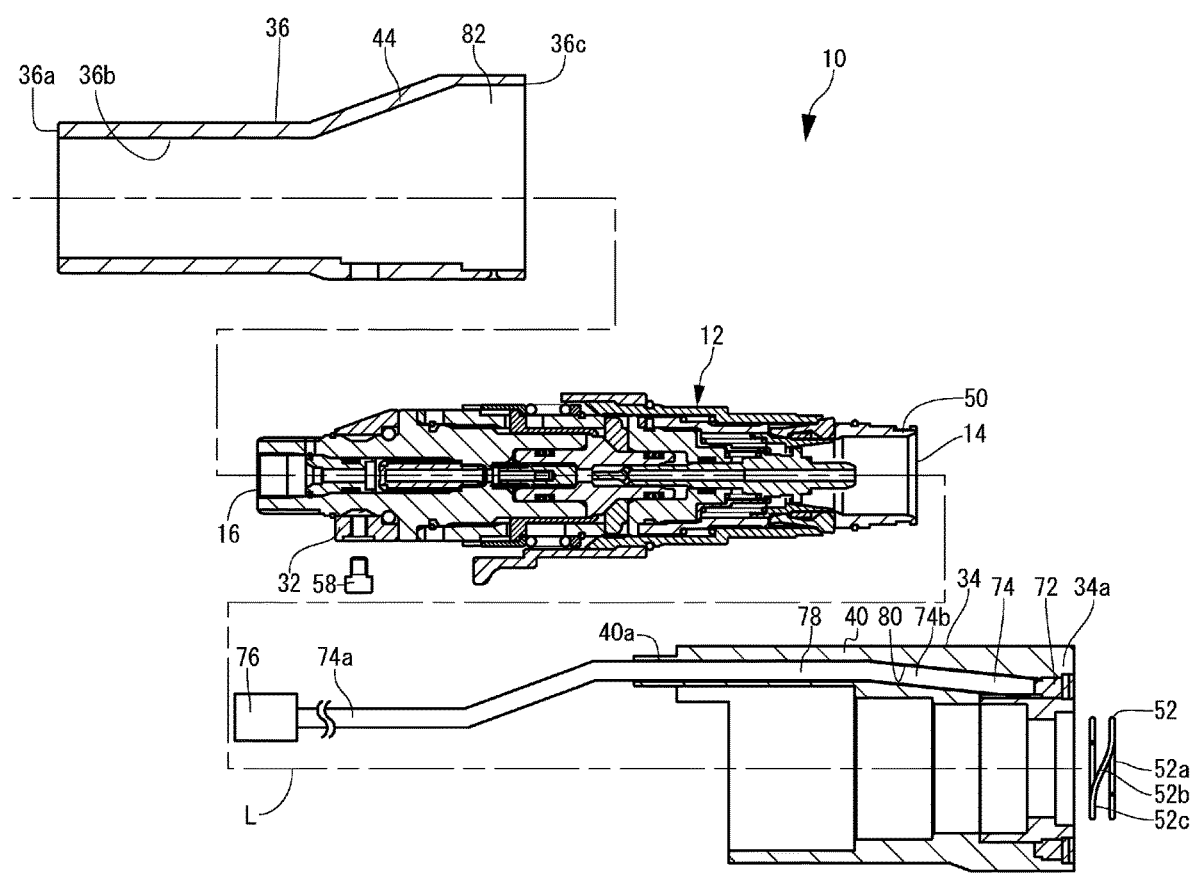
FIG. 10 is a fourth drawing showing the cylindrical cover attaching-detaching operation.

To remove the front cover member 34, first, the securing screw 58 securing the rear cover member 36 to the annular sliding member 32 is removed (FIG. 7). It should be noted that although only one securing screw 58 is shown in the figure, similar securing screws 58 are disposed at respective positions 90o spaced circumferentially from the illustrated securing screw 58 at both sides thereof. Next, the rear cover member 36 is displaced rearward from the female pipe coupling body 12 in a state where the hose (not shown) attached to the rear end 16 of the female pipe coupling body 12 and the communication cable 74 extending rearward from the front cover member 34 are allowed to pass inside the rear cover member 36 in the longitudinal direction (FIG. 8). At this time, a clearance sufficient to pass the connector terminal 76 is formed between an inner peripheral surface 36b of the rear cover member 36 and the hose, so that the rear cover member 36 can be displaced further rearward to a position beyond the connector terminal 76 while allowing the connector terminal 76 to pass inside the rear cover member 36. Next, the stop ring 52 attached to the annular groove 50 of the female pipe coupling body 12 is removed (FIG. 9), and the front cover member 34 is displaced forward (FIG. 10). Consequently, the communication assembly 78 is also removed from the female pipe coupling body 12, together with the front cover member 34. When the communication assembly 78 has failed due to breakage of the communication terminal 72 or the disconnection of the communication cable 74, for example, the communication assembly 78 is removed, together with the front cover member 34, as described above, and a front cover member 34 having a new communication assembly 78 is attached to the female pipe coupling body 12 by a procedure reverse to the above, thereby allowing replacement of the communication assembly 78. It should be noted that, in the above-described replacing operation, it is not always necessary to displace the rear cover member 36 to rearward of the connector terminal 76. The arrangement may, for example, be as follows. The rear cover member 36 is displaced to a position where a forward end 36c of the rear cover member 36 is around the rear end 16 of the female pipe coupling body 12, and where the connector terminal 76 is still rearward of the rear cover member 36, and when the front cover member 34 is to be removed, the communication cable 74 and the connector terminal 76 are pulled along the hose so as to pass forward inside the rear cover member 36. Thus, in the female pipe coupling member 10, the communication assembly 78 can be easily replaced without disassembling the female pipe coupling body 12.

Although one embodiment of the present invention has been described, the present invention is not limited to the described embodiment but can be modified in a variety of ways. For example, as a method of preventing the front cover member from being displaced rearward on the female pipe coupling body, the front cover member may be engaged with the rear cover member attached to the female pipe coupling body.

LIST OF REFERENCE SIGNS

Female pipe coupling member 10; female pipe coupling body 12; outer peripheral surface 12a; outer peripheral surface 12b; forward end 14; rear end 16; fluid passage 18; locking member 20; forward end 20a; latching projection 20b; lock operating member 22; cylindrical cover 30; annular sliding member 32; inner peripheral surface 32a; front cover member 34; front cover outer member 34-1; front cover inner member 34-2; forward end portion 34a; rear cover member 36; rear end 36a; inner peripheral surface 36b; forward end 36c; front circular cylindrical portion 38; rear end 38a; front protruding portion 40; rear end portion 40a; rear circular cylindrical portion 42; forward end 42a; outer peripheral surface 42b; rear protruding portion 44; opening 46; fitting portion 48; inner peripheral surface 48a; forward side surface 48b; rear side surface 48c; annular groove 50; forward side surface 50a; stop ring 52; front arcuate portion 52a; rear arcuate portion 52b; connecting portion 52c; step portion 54; locking through-hole 56; inner peripheral surface 56a; securing screw 58; head 58a; engaging member 60; forward end portion 60a; outer peripheral surface 60b; cylindrical mounting portion 62a; operating portion 62b; spring 63; first rolling members 64; second rolling members 66; first retaining recesses 68; second retaining recesses 70; communication terminal 72; communication cable 74; rearward portion 74a; forward portion 74b; connector terminal 76; communication assembly 78; cable hole 80; cable groove 82; longitudinal axis L.

The invention claimed is:

1. A female pipe coupling member having a communication terminal, the female pipe coupling member comprising:
   a female pipe coupling body couplable to a male pipe coupling member received therein from a forward end thereof to provide fluid communication between the male pipe coupling member and a hose attached to a rear end of the female pipe coupling body;
   a cylindrical front cover member fitted around the female pipe coupling body so as to be removable from the forward end side of the female pipe coupling body, the front cover member including a communication assembly comprising a communication terminal provided at a forward end thereof, a communication cable extending rearward from the communication terminal outside the female pipe coupling body and further extending rearward from the rear end of the female pipe coupling body, and a connector terminal connected to a rear end of the communication cable; and
   a cylindrical rear cover member fitted around the female pipe coupling body so as to be removable from the rear end side of the female pipe coupling body, the rear cover member being configured to allow the connector terminal to be passed forward inside the rear cover member along the hose, which is attached to the rear end of the female pipe coupling body, when the rear cover member is displaced rearward from the female pipe coupling body in a state where the hose and the communication cable are allowed to pass inside the rear cover member in a longitudinal direction.

2. The female pipe coupling member of claim 1, wherein the communication cable extends rearward from the communication terminal through inside the front cover member and further extends rearward from a rear end of the front cover member.

3. The female pipe coupling member of claim 1, wherein the front cover member fitted to the female pipe coupling body is prevented from being displaced rearward by engaging the female pipe coupling body.

4. The female pipe coupling member of claim 1, further comprising:
   a stop ring removably fitted in an annular groove formed in an outer peripheral surface of a forward end portion of the female pipe coupling body to engage the front cover member, so that the front cover member can be removed forward from the female pipe coupling body by removing the stop ring from the annular groove.

5. The female pipe coupling member of claim 1, wherein the rear cover member is secured to the female pipe coupling body in the longitudinal direction by a securing screw at a position where the rear cover member is fitted to the female pipe coupling body.

6. The female pipe coupling member of claim 1, wherein the front cover member has a front circular cylindrical portion surrounding a periphery of the female pipe coupling body, and an elongated front protruding portion protruding radially outward from the front circular cylindrical portion and extending in the longitudinal direction, the front protruding portion having a cable hole allowing the communication cable to pass therethrough in the longitudinal direction; and
   wherein the rear cover member has a rear circular cylindrical portion and a rear protruding portion, which correspond to the front circular cylindrical portion and the front protruding portion, respectively, of the front cover member, the rear protruding portion having a cable groove opening radially inward and extending in the longitudinal direction, the cable groove allowing passage therethrough of the communication cable extending from the rear end of the front protruding portion.

7. The female pipe coupling member of claim 6, wherein the female pipe coupling body has:
   a locking member for fixedly coupling the male pipe coupling member received from the forward end to the female pipe coupling body; and
   a lock operating member for displacing the locking member between a locking position and an unlocking position, the lock operating member extending from between the front cover member and the rear cover member to an outside of the front cover member and the rear cover member;
   the front protruding portion having a rear end portion extending rearward beyond a rear end of the front circular cylindrical portion to engage a forward end of the rear protruding portion;
   wherein when the front protruding portion and the rear protruding portion are engaged with each other, a circumferentially extending opening is formed between the front circular cylindrical portion and the rear circular cylindrical portion;
   the lock operating member having a cylindrical portion extending rearward from a forward end portion thereof that engages the locking member, through inside the front circular cylindrical portion, and an operating portion extending from the cylindrical portion to an outside of the rear circular cylindrical portion through the opening, so that the lock operating member is displaced between the locking position and the unlocking position by displacing the operating portion in the longitudinal direction.

* * * * *